(12) United States Patent
Tagami et al.

(10) Patent No.: US 9,641,712 B2
(45) Date of Patent: May 2, 2017

(54) IMAGE READING DEVICE AND IMAGE FORMING APPARATUS

(71) Applicant: KYOCERA Document Solutions Inc., Osaka (JP)

(72) Inventors: Yuya Tagami, Osaka (JP); Hiroyuki Harada, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/095,743

(22) Filed: Apr. 11, 2016

(65) Prior Publication Data

US 2016/0309049 A1    Oct. 20, 2016

(30) Foreign Application Priority Data

Apr. 17, 2015  (JP) ................................. 2015-085110

(51) Int. Cl.
*H04N 1/00*  (2006.01)
*H04N 1/40*  (2006.01)
*H04N 1/10*  (2006.01)

(52) U.S. Cl.
CPC ....... *H04N 1/00737* (2013.01); *H04N 1/0071* (2013.01); *H04N 1/00708* (2013.01); *H04N 1/00713* (2013.01); *H04N 1/00716* (2013.01); *H04N 1/00748* (2013.01); *H04N 1/00753* (2013.01); *H04N 1/00766* (2013.01); *H04N 1/00769* (2013.01); *H04N 1/00779* (2013.01);
(Continued)

(58) Field of Classification Search
CPC ........... H04N 1/00737; H04N 1/00708; H04N 1/0071; H04N 1/00713; H04N 1/00716; H04N 1/00748; H04N 1/00753; H04N 1/00766; H04N 1/00769; H04N 1/00779; H04N 1/00816; H04N 1/00827; H04N 1/1013; H04N 2201/0094; H04N 2201/0422

See application file for complete search history.

(56) References Cited

U.S. PATENT DOCUMENTS

| | | | |
|---|---|---|---|
| 5,880,858 A | 3/1999 | Jin | ................................ 358/487 |
| 8,049,931 B2 * | 11/2011 | Takahashi | .......... H04N 1/40087 358/1.1 |

(Continued)

FOREIGN PATENT DOCUMENTS

JP    H 7-170405 A    7/1995

OTHER PUBLICATIONS

Extended European search report dated Aug. 24, 2016, issued by the European Patent Office in corresponding application 16164875.3-1902.

*Primary Examiner* — Quang N Vo
(74) *Attorney, Agent, or Firm* — Stein IP, LLC (57) ABSTRACT

An image reading device generates, as image data of a reading region, image data for output and image data for size detection, the latter having a lower resolution than the former, discriminates high density lines from the size-detection image data, sets as a target line one of the high density lines. And the image reading device calculates as a width for size detection a width from a reference line to the target line, sets as the size of a document a reference size that has a width closest to the width for size detection, performs image processing on the output image data based on the reference size set as the size of the document, and outputs the processed image data.

10 Claims, 10 Drawing Sheets

(52) U.S. Cl.
CPC ..... *H04N 1/00816* (2013.01); *H04N 1/00827* (2013.01); *H04N 1/1013* (2013.01); *H04N 2201/0094* (2013.01); *H04N 2201/0422* (2013.01)

(56) References Cited

U.S. PATENT DOCUMENTS

| | | | |
|---|---|---|---|
| 2002/0033973 A1 | 3/2002 | Dolan et al. | 358/449 |
| 2002/0146173 A1 | 10/2002 | Herley | 382/199 |
| 2005/0270580 A1 | 12/2005 | Maki | 358/1.18 |
| 2007/0103735 A1 | 5/2007 | Ikeno et al. | 358/449 |
| 2009/0067758 A1 | 3/2009 | Iwaki et al. | 382/321 |
| 2012/0013954 A1 | 1/2012 | Iguchi | 358/449 |
| 2013/0083373 A1* | 4/2013 | Saito | H04N 1/00748 358/488 |
| 2014/0063570 A1 | 3/2014 | Kaempflein | 358/488 |

* cited by examiner

| No. | HORIZONTAL DIMENSION | VERTICAL DIMENSION |
|---|---|---|
| 1 | 85.60mm | 53.98mm |
| 2 | 105mm | 74mm |
| 3 | 125mm | 88mm |
| ⋮ | ⋮ | ⋮ |

FIG.13

IMAGE READING DEVICE AND IMAGE FORMING APPARATUS

INCORPORATION BY REFERENCE

This application is based upon and claims the benefit of priority from the corresponding Japanese Patent Application No. 2015-085110 filed on Apr. 17, 2015, the entire contents of which are incorporated herein by reference.

BACKGROUND

The present disclosure relates to an image reading device and an image forming apparatus.

In a conventional image reading device, in preparation for document reading, by a user, a document as a reading target is placed on a document stage, and the document placed on the document stage is held by a document cover. Then, when reading the document placed on the document stage, the image reading device radiates light toward the document stage, focuses the light reflected from the document and from the document cover on an image sensor, and generates image data based on an analog signal output from the image sensor.

The image data (read image data) generated as described above includes image data of the document and image data of the document cover. Thus, to extract only the image data of the document from the read image data, size detection of the document (document edge detection) is often performed based on the read image data. For example, in one conventional configuration, an edge of a document is detected by discriminating, from the read image data, black lines (lines of pixels corresponding to a shadow) that appear as a result of a shadow cast in the vicinity of an edge of the document being read.

SUMMARY

According to a first aspect of the present disclosure, an image reading device includes an image reading portion, an image processing portion, and a storage. The image reading portion shines light on a predetermined reading region including a region where a document is present, and reads the reading region. The image processing portion generates image data of the reading region read by the image reading portion, detects the size of the document based on the image data of the reading region, performs image processing on the image data of the reading region based on the size of the document, and outputs the processed image data. The storage stores size information that is information in which the vertical and horizontal dimensions for each of a plurality of kinds of reference sizes are defined. The image reading portion performs reading of the reading region with the document set in the reading region such that two edges of the document are aligned with reference lines that extend in the main and sub scanning directions. The image processing portion generates, as the image data of the reading region, image data for output and image data for size detection, the image data for size detection having a lower resolution than the output image data. The image processing portion discriminates, from the image data for size detection, high density lines, the high density lines being lines of pixels that appear as a result of a shadow cast in the vicinity of an edge of the document that does not overlap the reference lines being read, the high density lines extending in one direction out of the main and sub scanning directions. The image processing portion performs a target line setting process to set one of the high density lines as a target line. The image processing portion calculates as a width for size detection a width from, out of the reference lines that extend in the main and sub scanning directions, a reference line that extends in the one direction out of the main and sub scanning directions to the target line. The image processing portion sets as the size of the document a reference size having a width closest to the width for size detection out of the plurality of kinds of the reference sizes. The image processing portion performs image processing on the image data for output based on the reference size set as the size of the document, and outputs the processed image data.

According to a second aspect of the present disclosure, an image forming apparatus includes the image reading device described above.

DETAILED DESCRIPTION

Hereinafter, a description will be given of an image reading device and an image forming apparatus according to the present disclosure. The following description deals with, as an example, a multifunction peripheral having the functions of a copier, a printer, etc.

Figure 1:
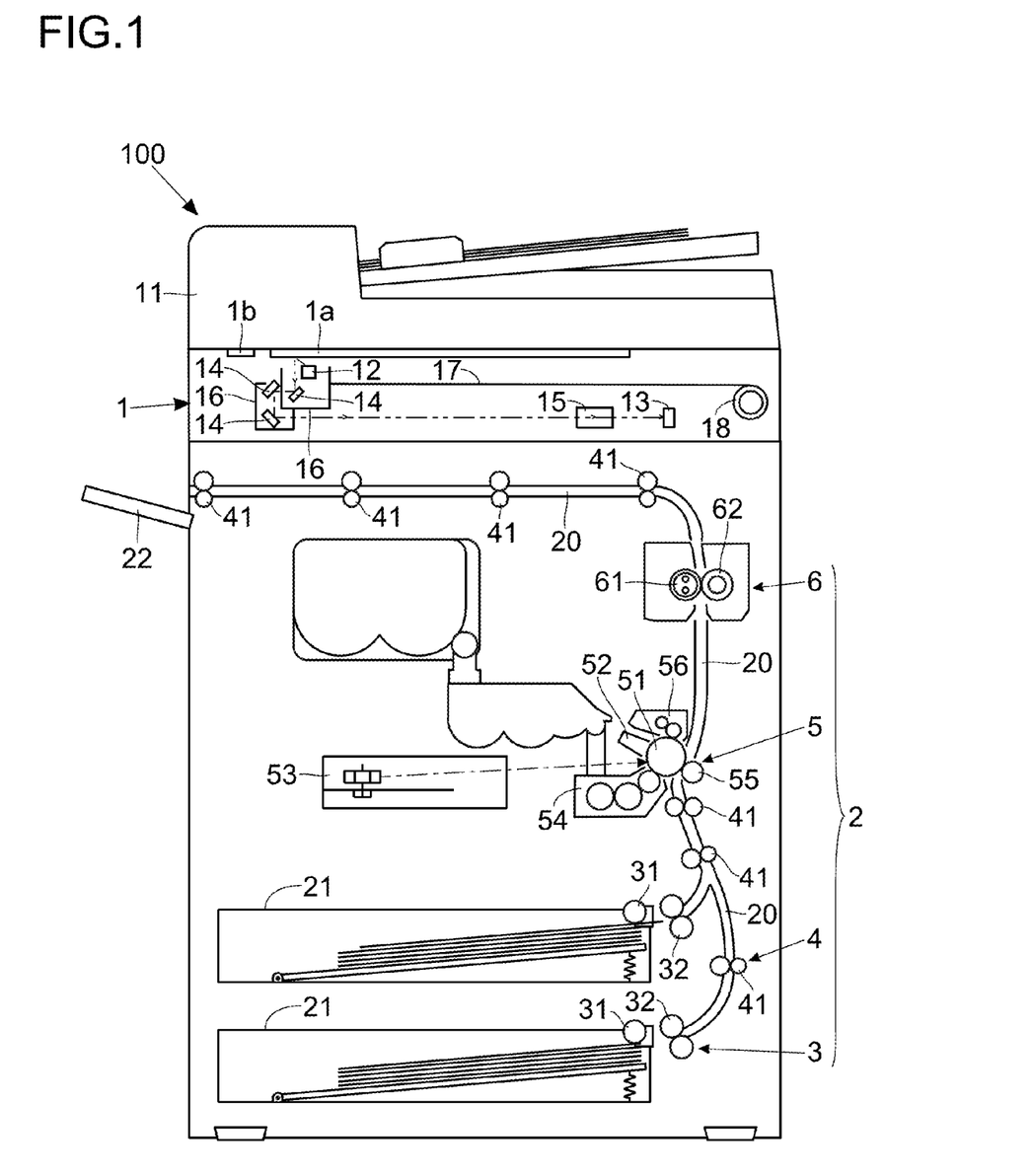
FIG. 1 is a schematic diagram of a multifunction peripheral according to one embodiment of the present disclosure.

Overall Construction of Multifunction Peripheral:

As shown in FIG. 1, in this embodiment, the multifunction peripheral 100 is provided with an image reading portion 1 including a document transport unit 11. Here, the multifunction peripheral 100 corresponds to an "image reading device" and an "image forming apparatus".

The image reading portion 1 has a frame having, fitted in it, a contact glass 1a for placement reading and a contact glass 1b for transport reading. The image reading portion 1 performs placement reading to read a document placed on the contact glass 1a and performs transport reading to read a document D passing across the contact glass 1b. In transport reading, a document is transported across the contact glass 1b by the document transport unit 11.

The image reading portion 1 includes a light source 12, an image sensor 13, a mirror 14, and a lens 15, and reads a document optically. These components that constitute the image reading portion 1 are arranged inside the frame of the image reading portion 1.

The light source 12 comprises a plurality of LED (light-emitting diode) elements and generates light with which a document is irradiated. The plurality of LED elements are arranged in a row extending in the main scanning direction. In placement reading, the light source 12 radiates light toward the contact glass 1a (the light that has been transmitted through the contact glass 1a illuminates the document). On the other hand, in transport reading, the light source 12 radiates light toward the contact glass 1b (the light that has been transmitted through the contact glass 1b illuminates the document). The light reflected from the document is then reflected on the mirror 14 so as to be guided into the lens 15. The lens 15 converges the reflected light.

The image sensor 13 reads a document line-by-line by receiving the light reflected from the document (the light converged through the lens 15). This image sensor 13 comprises a CCD (charge coupled device) having a plurality of photoelectric conversion elements arranged in a row extending in the main scanning direction. The image sensor 13, on receiving the reflected light, performs photoelectric conversion and stores electric charge for each pixel, line-by-line. Then, the image sensor 13 outputs an analog signal according to the stored electric charge. That is, the analog output from the image sensor 13 varies from one pixel to another according to the amount of reflected light.

The light source 12 and the mirror 14 are fitted to a movable frame 16 which is movable in the sub-scanning direction orthogonal to the main scanning direction. The movable frame 16 is coupled to one end of a wire 17. The other end of this wire 17 is coupled to a winding drum 18. Thus, as the winding drum 18 rotates, the movable frame 16 moves in the sub-scanning direction. That is, the light source 12 moves (the reading position moves) in the sub-scanning direction.

In placement reading, the light source 12 moves in a direction from left to right as seen from the front of the apparatus. The light source 12, while moving in the sub-scanning direction, irradiates a document placed on the contact glass 1a with light. Here, the image sensor 13 continuously and repeatedly performs photoelectric conversion on the light reflected from the document. Thus, document reading is performed line-by-line. In transport reading, the light source 12 remains at rest under the contact glass 1b and irradiates a document passing across the contact glass 1b with light.

Figure 2:
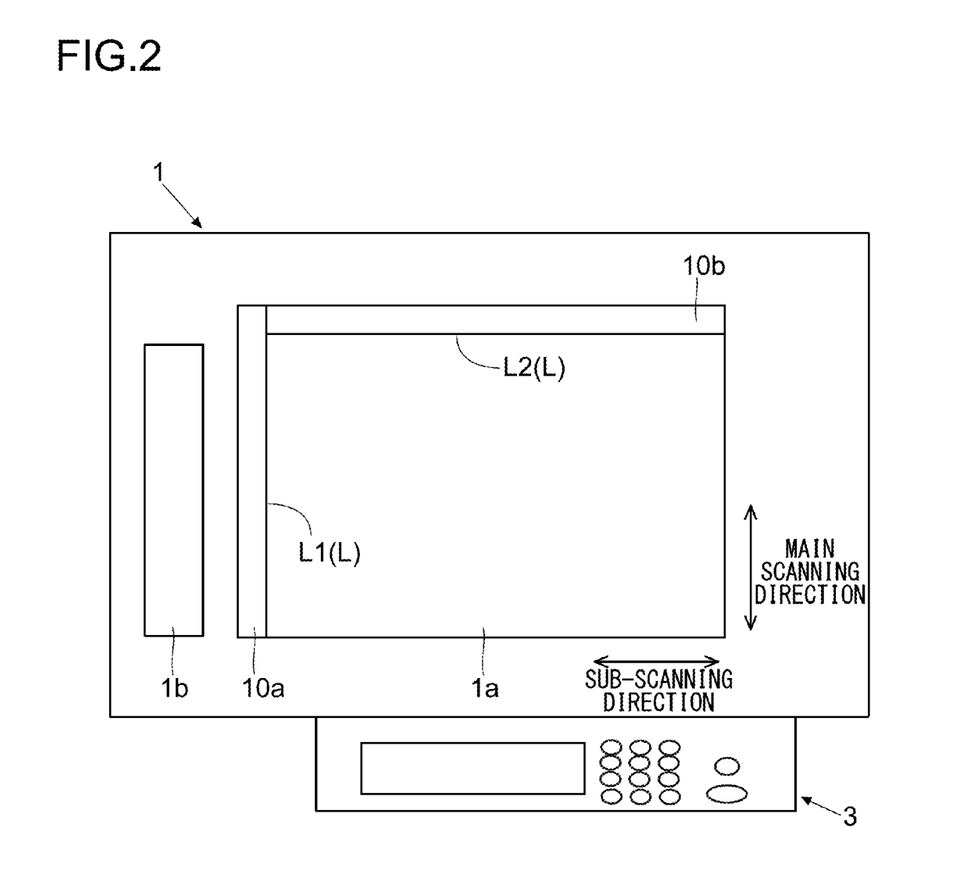
FIG. 2 is a plan view of an image reading portion (with a document transport unit omitted from illustration) of a multifunction peripheral according to one embodiment of the present disclosure.

Here, as shown in FIG. 2, when, in preparation for placement reading on the multifunction peripheral 100, a document is placed on the contact glass 1a, the size of the document is supposed to be detected, with two edges of the document aligned with reference lines L (L1 and L2) that extend in the main and sub scanning directions respectively. That is, on the contact glass 1a, the reference lines L are provided. To place a document on the contact glass 1a in a state aligned with the reference lines L, on the contact glass 1a, document scales 10a and 10b which function as document positioning members (members which indicate the placement position of a document) on the contact glass 1a are arranged. The document scale 10a is arranged so as to extend in the main scanning direction to determine the placement position of a document in the sub-scanning direction. The document scale 10b is arranged so as to extend in the sub-scanning direction to determine the placement position of a document in the main scanning direction.

Figure 3:
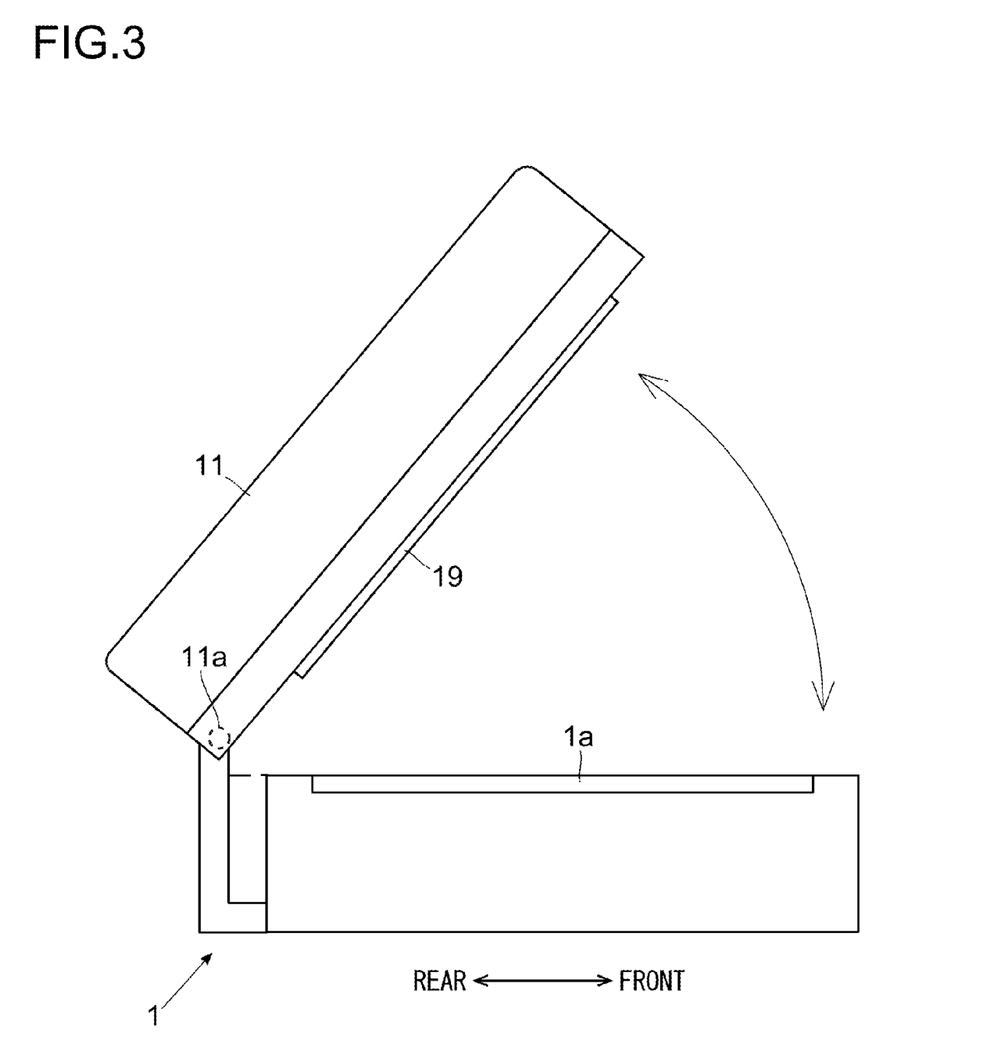
FIG. 3 is a side view of an image reading portion (with a document transport unit open) of a multifunction peripheral according to one embodiment of the present disclosure.

As shown in FIG. 3, the document transport unit 11 is fitted openably and closably (swingably) to the frame of the image reading device 1. Specifically, a rotary shaft 11a is provided on the frame on the rear side of the main body of the image reading device 1, and with the rotary shaft 11a as a pivot, the document transport unit 11 can be opened or closed. When the document transport unit 11 is closed, the document transport unit 11 overlaps the contact glass 1a, so that the contact glass 1a is completely covered by the document transport unit 11. In this way, when reading a document placed on the contact glass 1a, it is possible to hold the document under the document transport unit 11. On a part of the document transport unit 11 facing the contact glass 1a, a white pressing plate 19 is arranged to hold a document.

Back in FIG. 1, the multifunction peripheral 100 is provided with a printing portion 2. The printing portion 2 includes a sheet feeding portion 3, a sheet transporting portion 4, an image forming portion 5, and a fixing portion 6. The printing portion 2 transports a sheet along a sheet transport passage 20, and while transporting it, prints an image on the sheet.

The sheet feeding portion 3 includes a pick-up roller 31 and a sheet feeding roller pair 32, and feeds a sheet stored in a sheet cassette 21 into the sheet transport passage 20. The sheet transporting portion 4 includes a plurality of transport roller pairs 41, and transports a sheet along the sheet transport passage 20.

The image forming portion 5 includes a photosensitive drum 51, a charging device 52, an exposing device 53, a developing device 54, a transfer roller 55, and a cleaning device 56. The image forming portion 5 forms a toner image based on image data and transfers the toner image to a sheet. The fixing portion 6 includes a heating roller 61 and a pressing roller 62, and fixes the toner image transferred to the sheet by applying heat and pressure thereto. Having passed through the fixing portion 6, the sheet is transported along the sheet transport passage 20 and is discharged onto a discharge tray 22.

The multifunction peripheral 100 further includes an operation panel 3 (see FIG. 2). The operation panel 3 displays various screens and receives various settings by a user. For example, the operation panel 3 includes a display panel with a touch panel. The operation panel 3 displays, on the display panel, software keys to receive settings (touch operations) by a user.

Figure 4:
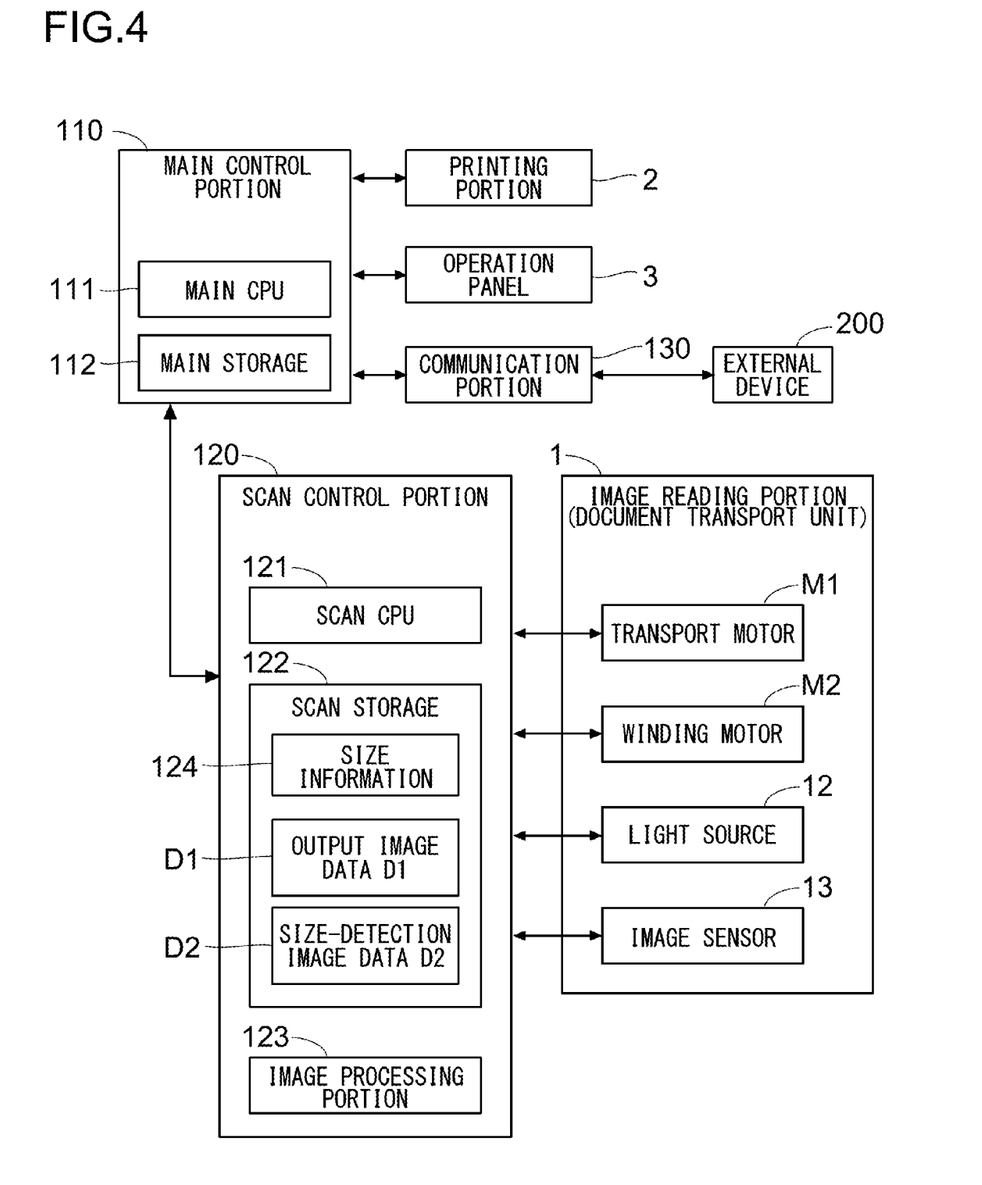
FIG. 4 is a block diagram showing a hardware configuration of a multifunction peripheral according to one embodiment of the present disclosure.

Hardware Configuration of Multifunction Peripheral:

As shown in FIG. 4, the multifunction peripheral 100 includes a main control portion 110. The main control portion 110 includes a main CPU (central processing unit) 111 and a main storage 112. The main storage 112 stores control programs and data. Based on these control programs and data, the main control portion 110 controls the printing operation of the printing portion 2. Moreover, the main control portion 110 detects operations on the operation panel 3 and controls the display on the operation panel 3.

To the main control portion 110, a scan control portion 120 is connected. The scan control portion 120 includes a scan CPU 121, a scan storage 122 (memory), and an image processing portion 123 (ASIC) (application-specific integrated circuit). This scan control portion 120 receives instructions from the main control portion 110, and controls the image reading operation of the image reading portion 1 and the document transport operation of the document transport unit 11.

Specifically, the scan control portion 120 is connected to a transport motor M1 for rotating document transport rollers (unillustrated) provided in the document transport unit 11, and rotates the document transport rollers properly. Moreover, the scan control portion 120 is connected to a winding motor M2 for rotating the winding drum 18, and rotates the winding drum 18 properly. That is, the scan control portion 120 properly moves the light source 12 in the sub-scanning direction. Furthermore, to the scan control portion 120, the light source 12 and the image sensor 13 are connected. The scan control portion 120 controls the operation of the light source 12 and of the image sensor 13.

The image processing portion 123 in the scan control portion 120 includes an amplification circuit and an A/D conversion circuit; it amplifies the image data (the analog output from the image sensor 13) obtained through document reading and generates digital image data. Moreover, the image processing portion 123 performs image processing such as shading correction, and outputs the processed image data to the main control portion 110. For example, the main control portion 110, on receiving image data from the scan control portion 120, generates image data for exposure (data for controlling exposure by the exposing device 53) to make the printing portion 2 perform printing based on the image data.

Moreover, to the main control portion 110, a communication portion 130 is connected. The communication portion 130 receives instructions from the main control portion 110 and exchanges various kinds of data such as image data with an external device 200 (a personal computer, a facsimile machine, or the like). For example, the main control portion 110, on receiving image data from the scan control portion 120, performs necessary image processing, and transmits the image data via the communication portion 130 to the external device 200. The external device 200 receives the image data from the multifunction peripheral 100 and displays, for example, an image based on the image data.

Size Detection of Card Document:

The multifunction peripheral 100 has an ID card copy mode as a mode for copying a card document D (see FIG. 5) such as an identification card. For example, in ID card copy mode, instructions for execution of jobs are received by the operation panel 3. Here, an identification card can be a driving license, an insurance card, a cash card, a credit card, or the like.

Figure 5:
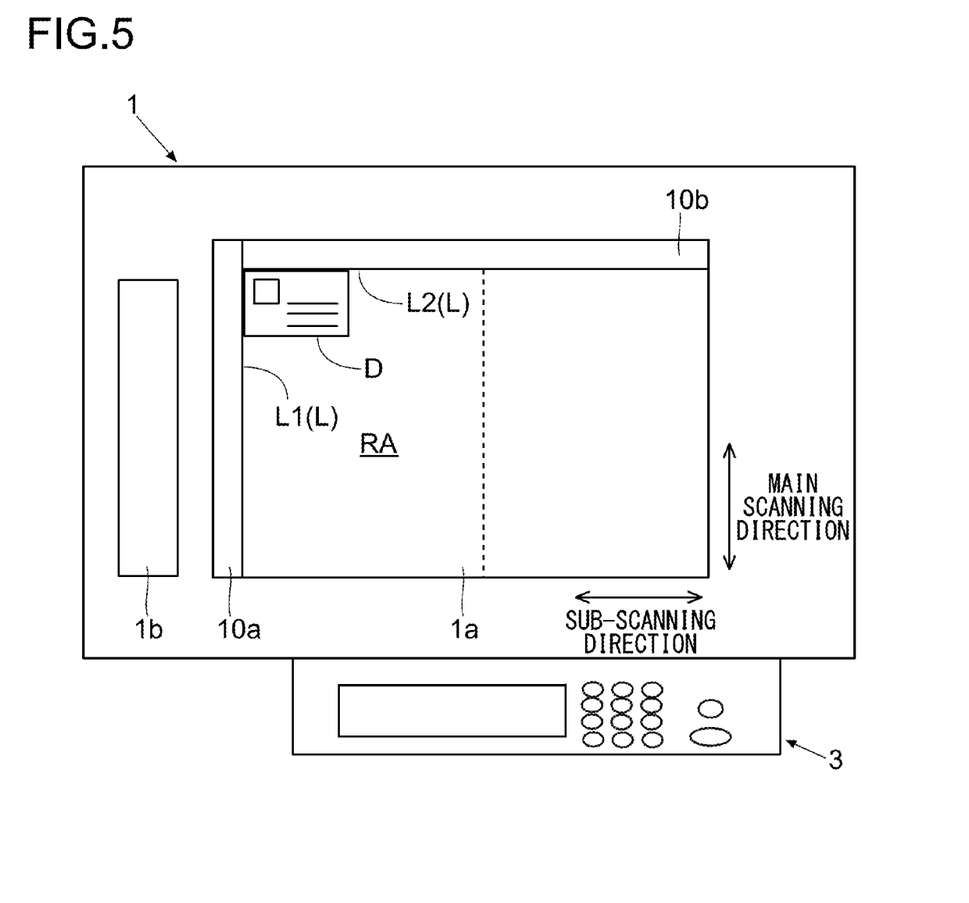
FIG. 5 is a diagram illustrating a card document set on a multifunction peripheral according to one embodiment of the present disclosure.

In preparation for execution of a job in ID card copy mode, as shown in FIG. 5, first, by a user, a card document D as a reading target is placed on the contact glass 1a, and the document transport unit 11 (see FIGS. 1 and 3) is closed. Also, when, in preparation for execution of the job in ID card copy mode, the card document D is placed on the contact glass 1a, two edges of the card document D are supposed to be aligned with the reference lines L. Then, when the operation panel 3 receives an instruction for execution of the job by a user, the main control portion 110 instructs the scan control portion 120 to make the image reading portion 1 perform reading of the card document D.

For example, in ID card copy mode, within the surface of the contact glass 1a, a region closer to the reference line L1 with respect to the broken-line in FIG. 5 is taken as a reading region RA. Thus, the reading region RA including a region where the card document D is present is read by the image reading portion 1. That is, with the card document D set in the reading region RA such that two edges of the card document D are aligned with the reference lines L (L1 and L2) that extend in the main and sub scanning directions respectively, the image reading portion 1 performs reading of the reading region RA. The size of the reading region RA is previously determined based on the largest size of the card document D which can be a reading target.

When the image reading portion 1 reads the reading region RA (including the region where the card document D is present), the image processing portion 123 generates image data of the reading region RA. Here, the image processing portion 123 generates, as the image data of the reading region RA, image data D1 for output and image data D2 for size detection, and stores them temporarily in the scan storage 122 (see FIG. 4). The process of generating the output image data D1 and the process of generating the size-detection image data D2 are executed concurrently.

The output image data D1 is data that serves as a basis for the image data that is fed to the main control portion 110. In other words, the output image data D1 can be basic data for an image that is output to be printed on a sheet by the printing portion 2. Or, the output image data D1 can be basic data for an image that is output to be displayed by the external device 200. For example, the output image data D1 has a resolution of 600 dpi.

The size-detection image data D2 is image data used for size detection of a card document D as will be described later, and is image data having a lower resolution than the output image data D1. The resolution of the size-detection image data D2 is one-fourth or one-eighth of the resolution of the output image data D1. The image processing portion 123, while generating the output image data D1, generates the size-detection image data D2 by use of an average-reduction method. For example, when the image data having a resolution of 600 dpi is reduced to one-eighth (75 dpi) by resolution conversion using an average-reduction method, the average density value of every eight pixels is taken as the density value of one pixel.

Thereafter, the image processing portion 123, by use of the size-detection image data D2, performs size detection of the card document D read by the image reading portion 1 (detects the widths of the card document D in the main and sub scanning directions respectively). To perform this size detection, the image processing portion 123 checks the density value of each pixel in the size-detection image data D2, and locates the edges (those edges which are not aligned with the reference lines L) of the card document D.

Figure 6:
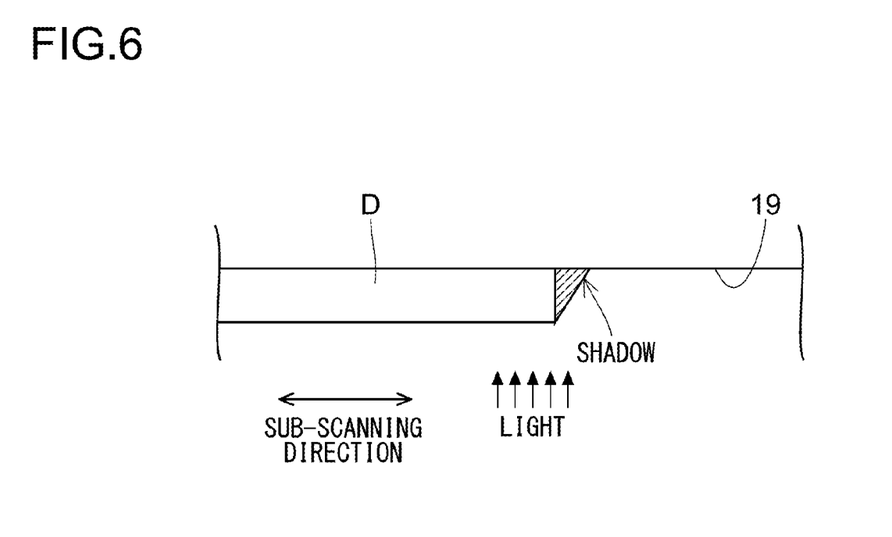
FIG. 6 is a diagram illustrating a shadow cast when a card document is read by a multifunction peripheral according to one embodiment of the present disclosure.

Here, due to the card document D having a thickness, when, while the card document D is read, light is shone in the vicinity of an edge of the card document D, as shown in FIG. 6, a level difference in the vicinity of the edge of the card document D casts a shadow. That is, a part of the white pressing plate 19 in the vicinity of the edge of the card document D (a part with which the card document D does not overlap) appears dark. In FIG. 6, the shadow cast in the vicinity of the edge of the card document D is indicated by hatching.

Figure 7:
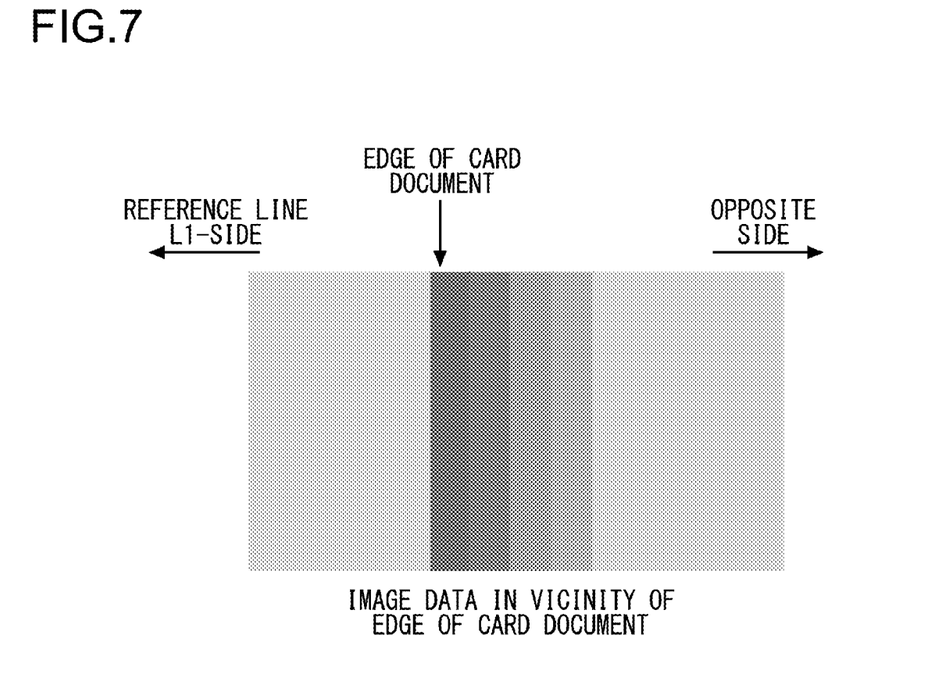
FIG. 7 is an enlarged diagram of a part (part corresponding to the vicinity of an edge of a card document) of image data of a card document generated by a multifunction peripheral according to one embodiment of the present disclosure.

The shadow cast in the vicinity of the edge of the card document D is read by the image reading portion 1. As a result, in a part of the image data of the reading region RA corresponding to the vicinity of the edge of the card document D, a high density line (a line with high density) appears, which is a line of a plurality of consecutive pixels with high density. By discriminating this high density line, the image processing portion 123 locates the edge of the card document D. Then, the image processing portion 123, based on the location of the edge of the card document D (the location of the high density line), detects the size of the card document D. As shown in FIG. 7, in the vicinity of an edge of the card document D, the density value gradually increases toward the reference line L1 that extends in the main scanning direction.

Next, with reference to the flow chart shown in FIG. 8, the flow of the process of detecting the size of the card document D will be described. The flow shown in FIG. 8 starts when the operation panel 3 receives an instruction for execution of a job in ID card copy mode.

The following description deals with, as an example, a case where size detection is performed based on the location in the sub-scanning direction of the high density line that extends in the main scanning direction (one direction) out of the main and sub scanning directions. Instead, size detection may be performed based on the location in the main scanning direction of the high density line that extends in the sub-scanning direction.

In step S1, the scan control portion 120 makes the image reading portion 1 perform reading of the reading region RA including the region where the card document D is present. Thereafter, in step S2, the image processing portion 123 generates image data (including the image data of the card document D) of the reading region RA read by the image reading portion 1. Here, the image processing portion 123 generates output image data D1 and size-detection image data D2, the latter having a lower resolution than the former.

Then, in step S3, the image processing portion 123 performs pixel-density discrimination on each pixel in the size-detection image data D2 to check whether or not it is a high density pixel having a density value higher than that of a predetermined pixel by a predetermined value or more.

Figure 9:
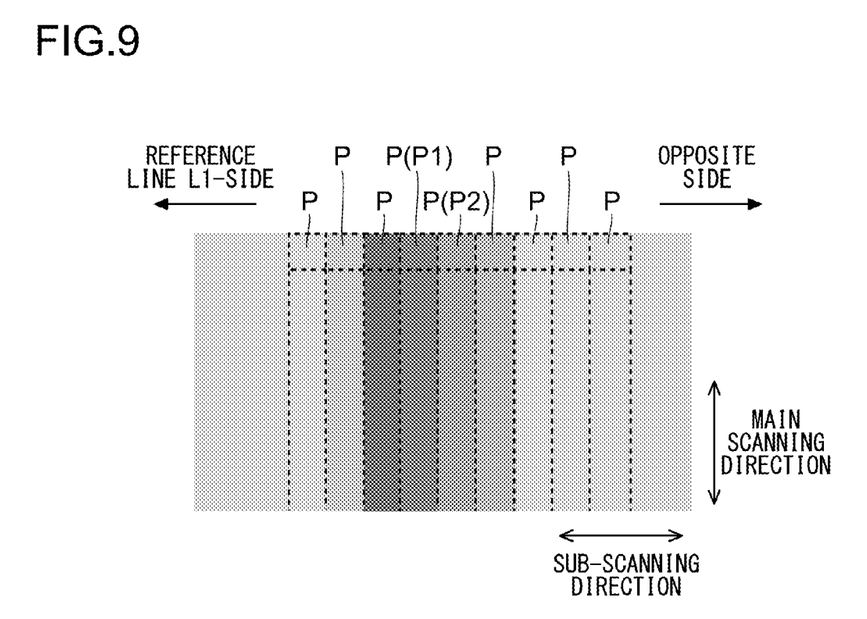
FIG. 9 is a diagram illustrating a target line setting process (discrimination of high density pixels) performed when the size of a card document is detected by a multifunction peripheral according to one embodiment of the present disclosure.

When performing pixel-density discrimination, the image processing portion 123 takes as the predetermined pixel a pixel located, with respect to a discrimination target pixel (hereinafter, also referred to as a pixel of interest), on the opposite side from the reference line L1 that extends in the main scanning direction. Specifically, the image processing portion 123, as shown in FIG. 9, takes as the predetermined pixel P2 a pixel P located next to the pixel of interest P (P1) on the opposite side from the reference line L1.

Figure 10:
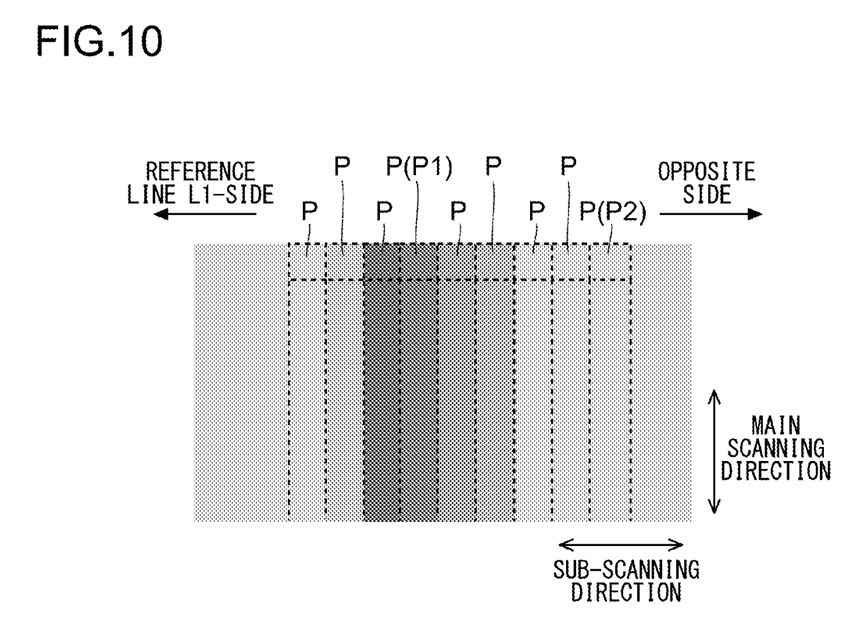
FIG. 10 is a diagram illustrating a target line setting process (discrimination of high density pixels) performed when the size of a card document is detected by a multifunction peripheral according to one embodiment of the present disclosure.

As another example, as shown in FIG. 10, a pixel P located a predetermined number of pixels (a predetermined number of lines) apart from the pixel of interest P1 on the opposite side from the reference line L1 may be taken as the predetermined pixel P2.

Here, the density value of the shadow cast in the vicinity of the edge of the card document D gradually increases toward the reference line L1. Thus, let the pixel P located next to the pixel of interest P1 on the opposite side from the reference line L1 be the predetermined pixel P2 (see FIG. 9), then even when the pixel of interest P1 is a pixel corresponding to the shadow, the pixel of interest P1 may not be discriminated as a high density pixel (the density value of the pixel of interest P1 may not be higher than the density value of the predetermined pixel P2 by the predetermined value or more). Thus, the pixel P located apart from the pixel of interest P1 is preferably taken as the predetermined pixel P2. This helps reliably discriminate a pixel corresponding to a shadow as a high density pixel (helps suppress occurrence of erroneous detection).

In a case where a pixel P located apart from the pixel of interest P1 is taken as a predetermined pixel P2, although no particular limitation is meant, for example, it is preferable to take as the predetermined pixel P2 a pixel P as many pixels apart from the pixel of interest P1 as the number of pixels corresponding to the width of the shadow (the shadow cast in the vicinity of the edge of the card document D) calculated based on the largest thickness of the card document D which can be a reading target. With this configuration, it is possible to more reliably discriminate a pixel corresponding to a shadow as a high density pixel.

Figure 11:
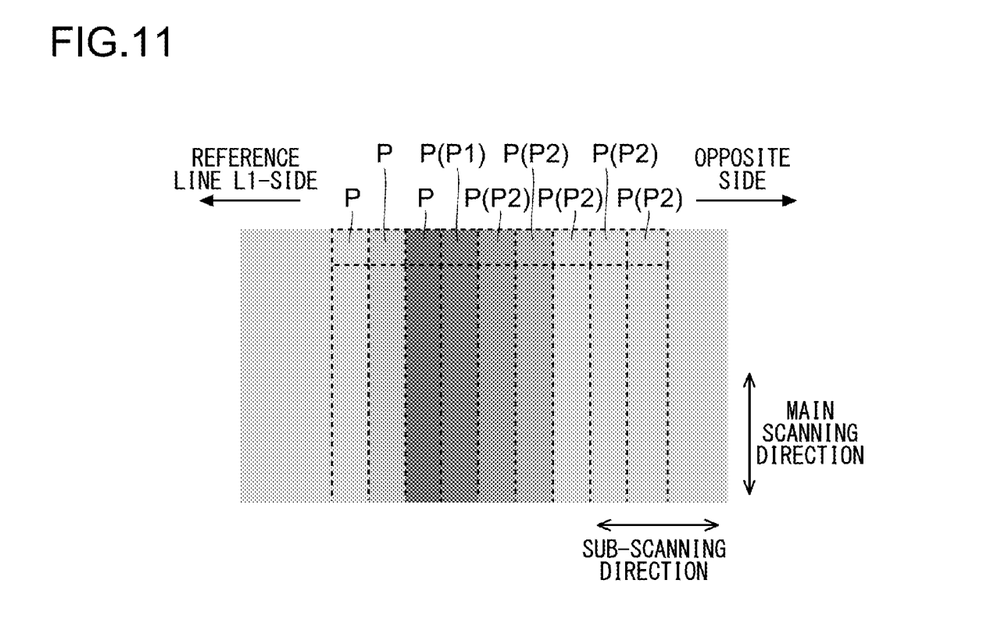
FIG. 11 is a diagram illustrating a target line setting process (discrimination of high density pixels) performed when the size of a card document is detected by a multifunction peripheral according to one embodiment of the present disclosure.

As yet another example, as shown in FIG. 11, a plurality of pixels P counted from the pixel P located next to the pixel of interest P1 on the opposite side from the reference line L1 may be taken as predetermined pixels P2. In this case, the image processing portion 123 calculates the average density value of the plurality of pixels P as the predetermined pixels P2. Then, the image processing portion 123 compares the density value of the pixel of interest P1 with the average density value of the predetermined pixels P2, and when the density value of the pixel of interest P1 is higher than the average density value of the predetermined pixels P2 by the predetermined value or more, the image processing portion 123 discriminates the pixel of interest P1 as a high density pixel.

Here, when only the pixel P located next to the pixel of interest P1 on the opposite side from the reference line L1 is taken as the predetermined pixel P2, then even when the pixel of interest P1 is a pixel corresponding to the shadow, if the pixel P located next to the pixel of interest P1 has increased density due to soil on the contact glass 1a or the pressing plate 19, the pixel of interest P1 may not be discriminated as a high density pixel (the density value of the pixel of interest P1 may not be higher than the density value of the predetermined pixel P2 by the predetermined value or more). Thus, preferably, the density value of the pixel of interest P1 is compared not only with the density value of the pixel P located next to the pixel of interest P1 but with the average density value of a plurality of pixels P including the pixel P. With this configuration, it is possible to more reliably discriminate a pixel corresponding to a shadow as a high density pixel.

Figure 8:
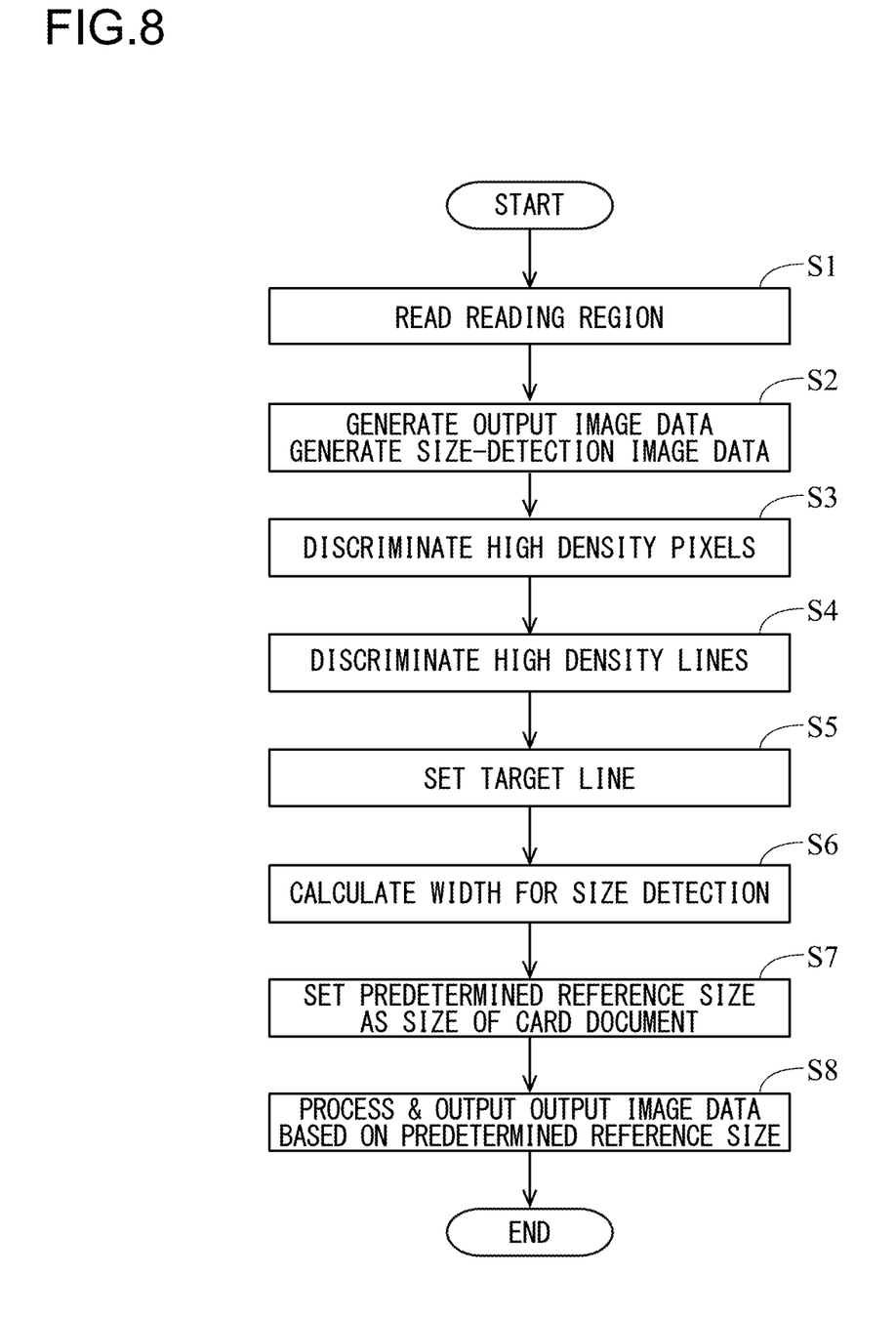
FIG. 8 is a flow chart illustrating the flow of a process of detecting the size of a card document by a multifunction peripheral according to one embodiment of the present disclosure.

Back in FIG. 8, after discriminating a high density pixel, in step S4, the image processing portion 123 discriminates a high density line. Specifically, the image processing portion 123 discriminates as a high density line a line of a plurality of (fewer than the pixels corresponding to the smallest width of the card document D which can be a reading target) consecutive pixels with high density in the main scanning direction. A plurality of lines, of which the number depends on the thickness of the read card document D, of pixels can be discriminated as high density lines.

Then, in step S5, the image processing portion 123 sets as a target line (a line used for size detection) one of the plurality of lines of pixels discriminated as high density lines. For example, the image processing portion 123 sets as the target line, out of the plurality of lines of pixels discriminated as high density lines, a line of pixels farthest from the reference line L1 that extends in the main scanning direction.

In some cases, the read card document D itself has a line with high density (such as a magnetic stripe). In this case, when, out of the plurality of lines of pixels as high density lines, a line of pixels other than the line of pixels farthest from the reference line L1 (for example, a line of pixels closest to the reference line L1) is set as the target line, the size of the card document D may be erroneously detected. Thus, it is preferable to take as the target line a line of pixels farthest from the reference line L1 out of a plurality of lines of pixels as high density lines.

Then, in step S6, the image processing portion 123, based on the number of pixels (the number of lines) from the reference line L1 that extends in the main scanning direction to the target line, calculates a width from the reference line L1 to the target line, and takes the width as a width for size detection (the width of one pixel multiplied by the number of lines from the reference line L1 to the target line). Then, in step S7, the image processing portion 123, based on the width for size detection, sets the size of the read card document D.

Figure 12:
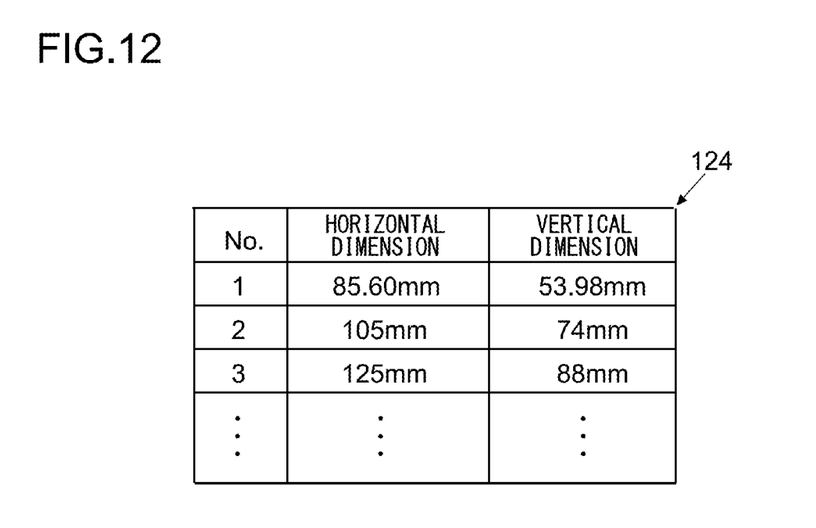
FIG. 12 is a diagram illustrating size information referred to when the size of a card document is detected by a multifunction peripheral according to one embodiment of the present disclosure.

For example, in the scan storage 122, size information 124 for setting the size of the read card document D is stored (see FIG. 4). This size information 124 is information in which a plurality of kinds of reference sizes are defined and in which the vertical and horizontal dimensions for each of the plurality of kinds of reference sizes are defined. The vertical and horizontal dimensions shown in the size information 124 are determined, for example, based on an international standard for identification cards (ISO/IEC 7810). One example of the size information 124 is shown in FIG. 12.

A size can be added to, or deleted from, those defined in the size information 124 as necessary. For example, settings relating to adding or deleting a size to or from those defined in the size information 124 are received by the operation panel 3.

Then, the image processing portion 123 discriminates, of the plurality of kinds of reference sizes defined in the size information 124, a predetermined reference size that has a width closest to the width for size detection (the width from the reference line L1 to the target line), and sets the discriminated predetermined reference size as the size of the card document D. For example, with the size information 124 shown in FIG. 12, when a width closest to the width for size detection is 85.60 mm, the size set by the image processing portion 123 is size No. 1 (85.60 mm times 53.98 mm). For another example, when a width closest to the width for size detection is 74 mm, the size set by the image processing portion 123 is size No. 2 (105 mm times 74 mm).

Then, in step S8, the image processing portion 123, based on the predetermined reference size set as the size of the card document D, performs image processing on the output image data D1, and outputs the result to the main control portion 110. For example, the image processing portion 123 performs a process of extracting image data of a region corresponding to the predetermined reference size from the output image data D1. The image processing portion 123 then outputs the image data to the main control portion 110.

As described above, the multifunction peripheral 100 (image reading device and image forming apparatus) according to the present embodiment includes an image reading portion 1 which shines light on a predetermined reading region RA including a region where a card document D (document) is present, and which reads the reading region RA, an image processing portion 123 which generates image data of the reading region RA read by the image reading portion 1, and which detects the size of the card document D based on the image data of the reading region RA, the image processing portion 123 performing image processing on the image data of the reading region RA based on the size of the card document D and outputting the processed image data, and a storage 122 which stores size information 124 that is information in which a plurality of kinds of reference sizes are defined and in which the vertical and horizontal dimensions for each of the plurality of kinds of reference sizes are defined. In preparation for reading by the image reading portion 1, a card document D is set (placed on a contact glass 1a) such that two edges of the card document D are aligned with reference lines L (L1 and L2) that extend in the main and sub scanning directions respectively.

In this configuration, the image processing portion 123 generates, as the image data of the reading region RA, image data for output D1 and image data for size detection D2, the size-detection image data D2 having a lower resolution than the output image data D1. The image processing portion 123 discriminates, from the size-detection image data D2, high density lines, the high density lines being lines of pixels that appear as a result of a shadow cast in the vicinity of an edge of the card document D that does not overlap the reference lines L being read, the high density lines extending in the main scanning direction. The image processing portion 123 performs a target line setting process to set as a target line one of a plurality of lines of pixels discriminated as the high density lines. The image processing portion 123 calculates as a width for size detection a width from the reference line L1 that extends in the main scanning direction to the target line. The image processing portion 123 sets as the size of the card document D a reference size having a width closest to the width for size detection out of the plurality of kinds of reference sizes. Then, the image processing portion 123 performs image processing on the output image data D1 based on the reference size set as the size of the card document D, and outputs the result.

In this embodiment, the output image data D1 and the size-detection image data D2 are generated, and out of these two sets of data, by use of the size-detection image data D2, size detection of a card document D is performed. Since the size-detection image data D2 has a lower resolution (fewer pixels) than the output image data D1, the high density lines (lines of pixels corresponding to a shadow cast in the vicinity of an edge of the card document D) can be discriminated at increased speed. As a result, size detection of a card document D can be completed speedily.

Moreover, even if the contact glass 1a or a pressing plate 19 is soiled, the density values of pixels corresponding to the soil are converted to lower density values by resolution conversion using an average-reduction method. This helps suppress occurrence of erroneous detection due to soil on the contact glass 1a or the pressing plate 19.

Incidentally, when the target line setting process is performed, a target line may be set with consideration given to the width of a shadow cast in the vicinity of an edge of the card document D. In this configuration, shadow information that defines the width of a shadow (a shadow cast in the vicinity of an edge of the card document D) calculated based on the largest thickness of the card document D which can be a reading target is previously stored in the scan storage 122. As shown in FIG. 6, a shadow is cast in the vicinity of an edge of the card document D due to the card document D having a thickness (the thicker the card document D is, the larger the width of the shadow is). Thus, when the thickness of a card document D is known, the width of the shadow can be calculated based on the thickness.

Figure 13:
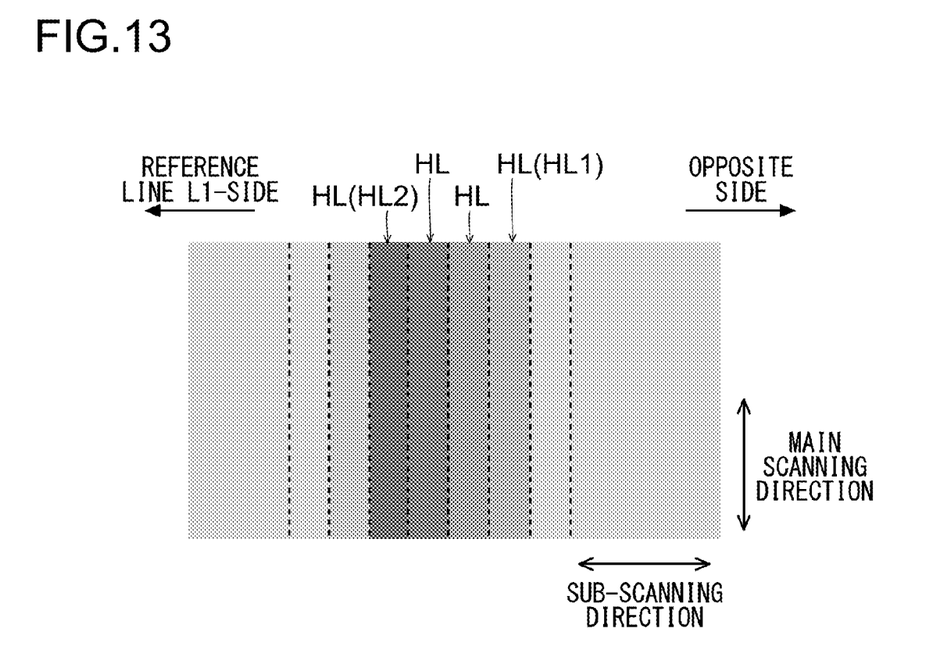
FIG. 13 is a diagram illustrating a target line setting process performed when the size of a card document is

Now, as shown in FIG. 13, when performing the target line setting process, the image processing portion 123 discriminates, out of a plurality of lines of pixels HL discriminated as the high density lines, a line of pixels HL1 farthest from the reference line L1 that extends in the main scanning direction. Then, the image processing portion 123 sets as the target line a line of pixels HL2 located at a position advanced toward the reference line L1 over the number of lines (the number of pixels) counted from the line of pixels HL1 corresponding to the width of the shadow defined in the shadow information.

With this configuration, the deviation of a width for size detection (a width from the reference line L1 to a target line) from the actual width of a card document D is reduced. This helps accurately perform size detection of a card document D. In the shadow detection algorithm, the outermost pixel of a region with increased density is detected, and thus the size of a card document D that is actually detected tends to be larger than it actually is by the width of a shadow. Thus, by subtracting the width of the shadow from the detected size, it is possible to obtain a more accurate size. That is, by previously calculating the width of a shadow for a given thickness or size, and performing correction as by subtracting it from the detected size of a card document D, it is possible to obtain a more accurate size.

Moreover, when the target line setting process is performed, each pixel in the size-detection image data may be checked against the density value of the white pressing plate 19 to discriminate whether or not the pixel is a high density pixel. In this configuration, the density value of the pressing plate 19 calculated based on the image data obtained by reading the pressing plate 19 is previously stored in the scan storage 122.

Then, when performing the target line setting process, the image processing portion 123 discriminates, for each pixel in the size-detection image data, whether or not the pixel is a high density pixel having a higher density value than the pressing plate 19 by the predetermined value or more. Moreover, the image processing portion 123 discriminates high density lines that are lines of a plurality of consecutive pixels with high density in the main scanning direction. After this discrimination, the image processing portion 123 sets as the target line, out of the plurality of lines of pixels discriminated as the high density lines, a line of pixels farthest from the reference line L1 that extends in the main scanning direction.

It should be understood that the embodiments disclosed herein are illustrative in all respects and are not restrictive. The scope of the present disclosure is defined not by the description of embodiments given above but by the appended claims, and encompasses many modifications and variations made in the sense and scope equivalent to those of the claims.

What is claimed is:

1. An image reading device comprising:
an image reading portion which shines light on a predetermined reading region including a region where a document is present, and which reads the reading region;
an image processing portion which generates image data of the reading region read by the image reading portion, and which detects a size of the document based on the image data of the reading region, the image processing portion performing image processing on the image data of the reading region based on the size of the document and outputting the processed image data; and
a storage which stores size information that is information in which vertical and horizontal dimensions for each of a plurality of kinds of reference sizes are defined, wherein
the image reading portion performs reading of the reading region with the document set in the reading region such that two edges of the document are aligned with reference lines that extend in main and sub scanning directions,
the image processing portion generates, as the image data of the reading region, image data for output and image data for size detection, the image data for size detection having a lower resolution than the image data for output,
the image processing portion discriminates, from the image data for size detection, high density lines, the high density lines being lines of pixels that appear as a result of a shadow cast in a vicinity of an edge of the document that does not overlap the reference lines being read, the high density lines extending in one direction out of the main and sub scanning directions,
the image processing portion performs a target line setting process to set one of the high density lines as a target line,
the image processing portion calculates as a width for size detection a width from, out of the reference lines that extend in the main and sub scanning directions, a reference line that extends in the one direction out of the main and sub scanning directions to the target line,
the image processing portion sets as the size of the document a reference size having a width closest to the width for size detection out of the plurality of kinds of the reference sizes, and
the image processing portion performs image processing on the image data for output based on the reference size set as the size of the document, and outputs the image data.

2. The image reading device of claim 1, wherein
when performing the target line setting process, the image processing portion performs pixel-density discrimination on each pixel in the image data for size detection to check whether or not the pixel is a high density pixel having a higher density value than a predetermined pixel by a predetermined value or more, discriminates, as the high density lines, lines of consecutive pixels with high density in the one direction, and sets as the target line, out of a plurality of lines of pixels discriminated as the high density lines, a line of pixels farthest from the reference line that extends in the one direction, and
when performing the pixel-density discrimination, the image processing portion takes as the predetermined pixel a pixel located on an opposite side of a discrimination target pixel from the reference line that extends in the one direction.

3. The image reading device of claim 2, wherein
the image processing portion takes as the predetermined pixel a pixel located next to the discrimination target pixel on the opposite side thereof from the reference line that extends in the one direction.

4. The image reading device of claim 2, wherein
the image processing portion takes as the predetermined pixel a pixel located a predetermined number of pixels apart from the discrimination target pixel on the opposite side thereof from the reference line that extends in the one direction.

5. The image reading device of claim 4, wherein
the predetermined number of pixels is set equal to or larger than a number of pixels corresponding to a width of the shadow calculated based on a largest thickness of a document which can be a reading target.

6. The image reading device of claim 2, wherein
the image processing portion takes as the predetermined pixel a plurality of pixels counted from a pixel located next to the discrimination target pixel on the opposite side thereof from the reference line that extends in the one direction, and discriminates as the high density pixel a pixel of which a density value is higher than an average density value of the plurality of pixels as the predetermined pixel by the predetermined value or more.

7. The image reading device of claim 1, wherein
the storage stores a width of the shadow calculated based on a largest thickness of a document which can be a reading target, and
when performing the target line setting process, the image processing portion discriminates, out of a plurality of lines of pixels discriminated as the high density lines, a line of pixels farthest from the reference line that extends in the one direction, and sets as the target line a line of pixels located at a position advanced, over a number of lines counted from the discriminated line of pixels corresponding to the width of the shadow, toward the reference line that extends in the one direction.

8. The image reading device of claim 1, wherein
the image reading portion includes a white pressing plate for holding the document when reading the document,
the storage stores a density value of the pressing plate calculated based on image data obtained by reading the pressing plate, and
when performing the target line setting process, the image processing portion discriminates, for each pixel in the image data for size detection, whether or not the pixel is a high density pixel having a higher density value than the pressing plate by a predetermined value or more, discriminates, as the high density lines, lines of consecutive pixels with high density in the one direction, and sets as the target line, out of a plurality of lines of pixels discriminated as the high density lines, a line of pixels farthest from the reference line that extends in the one direction.

9. The image reading device of claim 1, wherein
the document is a card document.

10. An image forming apparatus comprising the image reading device of claim 1.

* * * * *